Sept. 20, 1966   R. S. SULLIVAN ETAL   3,274,364
BY-PASS SWITCH FOR OPERATION WITHOUT INTERRUPTING SERVICE
Filed April 30, 1962   3 Sheets-Sheet 1

INVENTORS:
ROBERT S. SULLIVAN
THOMAS B. ORTWIG
BY *Sutherland Polster & Taylor*
ATTORNEYS.

Sept. 20, 1966    R. S. SULLIVAN ETAL    3,274,364
BY-PASS SWITCH FOR OPERATION WITHOUT INTERRUPTING SERVICE
Filed April 30, 1962    3 Sheets-Sheet 2
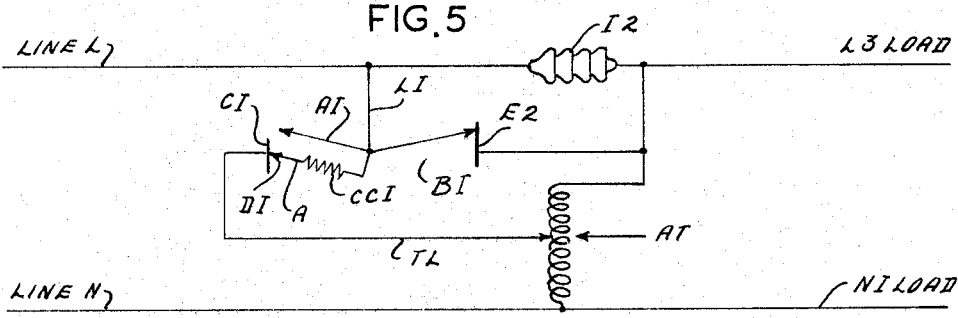
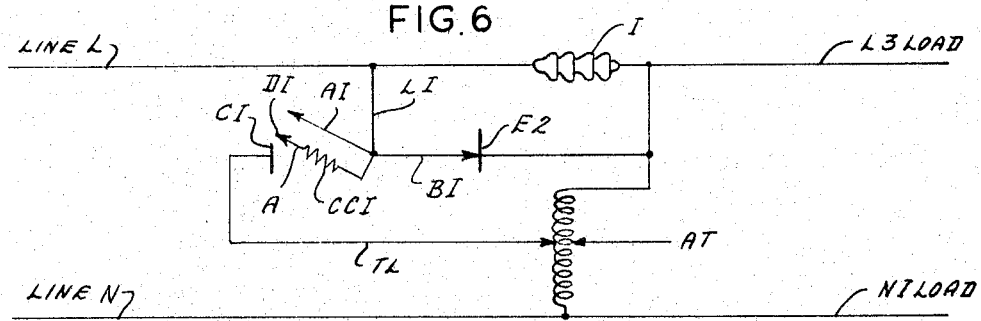
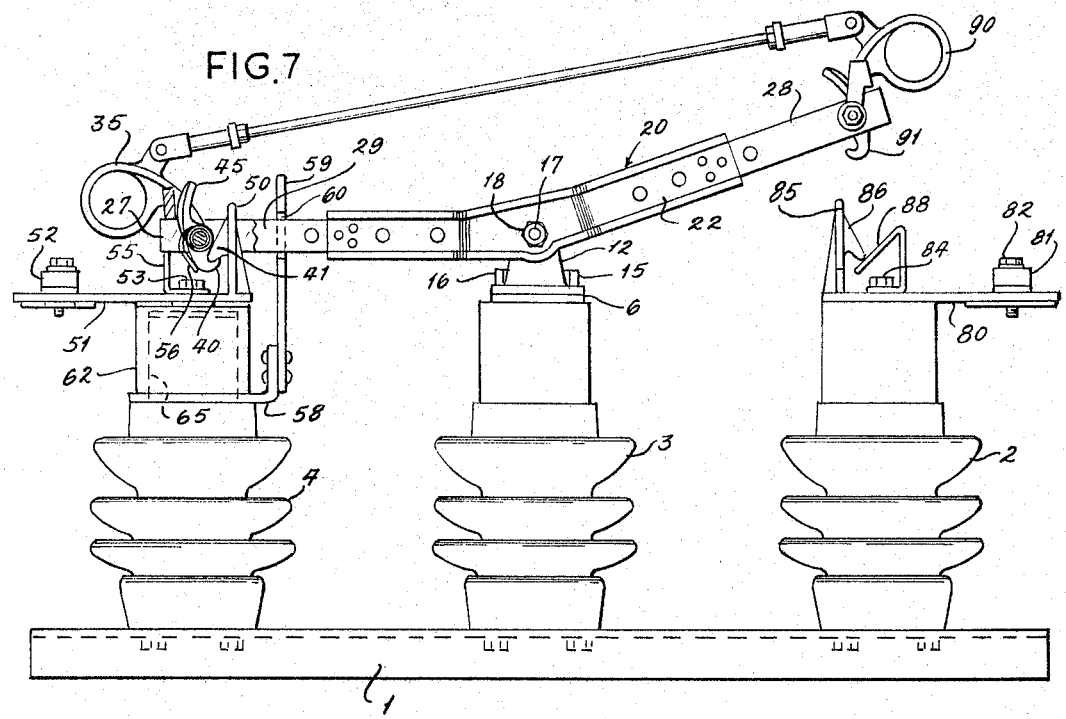
INVENTORS:
ROBERT S. SULLIVAN
THOMAS B. ORTWIG
BY *Sutherland Polster & Taylor*
ATTORNEYS.

INVENTORS:
ROBERT S. SULLIVAN
THOMAS B. ORTWIG

*Sutherland Poleter & Taylor*
ATTORNEYS.

United States Patent Office 3,274,364
Patented Sept. 20, 1966

3,274,364
BY-PASS SWITCH FOR OPERATION WITHOUT INTERRUPTING SERVICE
Robert S. Sullivan, Lahore, West Pakistan, Pakistan, and Thomas B. Ortwig, Florissant, Mo., assignors to Kearney-National Inc., a corporation of Delaware
Filed Apr. 30, 1962, Ser. No. 190,880
6 Claims. (Cl. 200—146)

This invention relates to improvements in electric switch gear and more specifically to a double throw disconnect switch connected with a circuit through a booster transformer for an electric distribution system so arranged as to cut in, or cut out, the portion of the booster transformer circuit termed the "teaser" winding of an autotransformer without interruption of the load on the distribution line.

In electric distribution systems, it is not unusual to experience a voltage drop in certain of the branches of that system due primarily to local increased demand for power by the customers supplied by one of the branches of such systems. When this occurs, complaints come in to the power company based upon the observed effects of a low voltage condition in the power supply. Rather than completely revise the distribution system to take care of this condition in one of its branches, it is often more economical and practical for the power company to install a transformer which will boost voltage in the particular branch. Especially is this so if the complaint, or condition causing the complaint, is caused by temporary conditions, or caused by a condition which might be merely seasonal in occurrence. One of the most economical solutions to these complaints is to install a booster transformer in the line and a switch connected therewith for cutting the booster transformer into the circuit, or shunting the booster transformer out of the circuit. Heretofore this solution had the objection that when cutting out the transformer, it was necessary to remove the load on the circuit or branch. Otherwise, serious arcing would take place during the switch-over. Nevertheless, such installations have met with favor because as a solution it offered an economical answer to, let us say, seasonal changes in load on the particular branch. If this were the cause, then the transformer could readily be cut in at the beginning of a season in anticipation of voltage drop and cut out at the end of the season when the temporary condition no longer existed.

It is a primary object of this invention to provide a disconnect switch adapted for use in such a circuit with an autotransformer which can be operated without interrupting the service throughout the branch line.

It is still another object of this invention to provide a switch for use with an auto-transformer in a branch line power supply which can be tailored to operate under a variety of voltage or load conditions without interrupting the service during change-over of switch positions.

According to this invention, a disconnect switch of the double throw type is connected to cut in the booster transformer into the line circuit when closed in one position and to shunt, or by-pass, the transformer when closed in another position. In order to carry out the objects of this invention, the switch has a blade hinged in the middle with fixed contacts at its opposite ends with which it can rockably engage alternately. This switch is so constructed that when rocked in one direction, the blade engages a fixed contact in a by-pass around the teaser winding in the autotransformer to make a direct connection in the branch of the distribution system. When rocked in the opposite direction, the blade first closes contacts in an auxiliary circuit containing a choke coil or resistor winding connected in series with the teaser winding of the autotransformer and with the load in the branch line of the distribution system. Further switch movement then causes disengagement between the fixed and movable contacts of the switch which are in the circuit forming the by-pass around the teaser winding and then connect directly with a circuit through the teaser winding to the load in the branch of the distribution system. At the same time that the direct connection is made through the teaser winding of the autotransformer, the circuit through the resistor, or choke coil, in series with the teaser winding is opened. As the teaser winding is cut into the circuit by the above-described action of the switch, the autotransformer will increase the voltage in the branch of the distribution system a predetermined amount to counteract the voltage drop.

The switchover to by-pass position of the switch would be especially dangerous due to possible arcing, especially if there is a load on the branch of the distribution system. Since this normally is the case, it has heretofore been necessary to remove this load before switching to the by-pass position. This means an interruption of service. With the instant invention, no interruption is necessary. When the switch is rocked in the opposite direction to cut out, or by-pass the autotransformer, before this circuit is open, the resistor, or choke coil, is cut into the circuit in parallel with the direct load through the autotransformer so that subsequently when the main circuit through the autotransformer is opened by the opening of the switch contacts there exists a closed circuit through the resistor coil and the teaser winding of the autotransformer which is maintained closed while the other pair of contacts in the switch complete the direct by-pass connection around the autotransformer. Only then does the circuit through the resistor coil open, and this is accomplished as the switch fully closes the contacts in the by-pass connection. Thus, the circuit is never fully interrupted as the switch is moved from by-pass to booster and from booster back to by-pass positions.

The switch construction is such that its mechanical operation fits into its electrical application. Opposite ends thereof have pull ring operated latches which are locked respectively with the fixed contacts when fully closed therewith. The switch can be operated by a hook on the end of a hot line stick engaging with either pull ring, and the nature of the latch release mechanism is such that the force exerted by the hot line stick will flip the switch mechanically from one position to the other so that there will be a mechanical action so fast and over a small distance that changeover will not be noticeable to the consumer supplied by the particular branch of the distribution system.

Other objects and advantages of this invention will appear from the following detailed description which is in such full, clear and concise terms as to enable any one skilled in the art to make and use the same when taken with the accompanying drawings forming a part thereof and in which:

FIG. 5 is a schematic illustration of the embodiment shown in FIG. 4 with the parts of the device in a second operative position;

FIG. 6 is a schematic illustration of the embodiment shown in FIG. 4 illustrating the parts of the device in a third operative position;

FIG. 7 is a side elevation of a double throw switch construction suitable for use in the system shown in FIG. 1 and FIG. 3;

Figure 1:
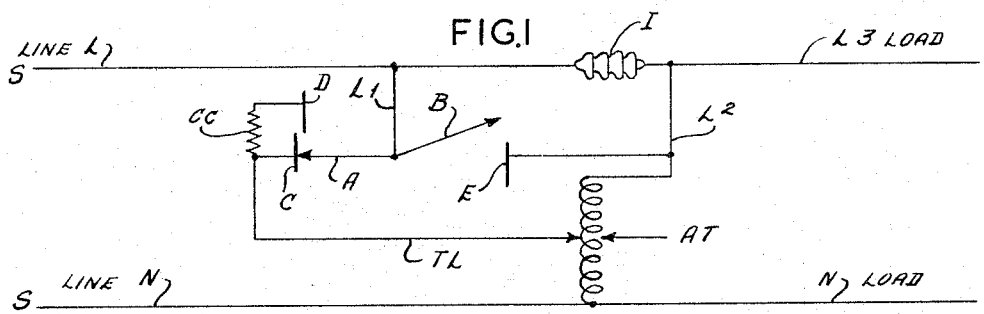
FIG. 1 is a schematic illustration of one embodiment of the instant invention showing the parts in a first operative position.

Turning now to the schematic illustration of FIG. 1, therein depicted is a portion of a branch in an electric distribution system having two supply lines, a neutral N and a live line L. Neutral N is supplied with current at the end S and connects with the load, as illustrated at its right end. One end of a coil of an autotransformer AT connects with the line N between supply and the load. The live line L connected at its left end with the supply extends to an insulator I and from the insulator I to the load. A branch line L–1 connects with the line L to the center of rockably mounted switch with the arms A and B extending in opposite directions from its hinged center. The right part of the switch arm B is adapted to engage and disengage a fixed contact E connected with a line L–2 which in turn forms a continuation of a line extending from the opposite end of a coil in the autotransformer AT. The contact E cooperates with the movable blade part B of the switch to form a by-pass connection around the autotransformer AT. This by-pass connection will connect the line L through the line L–1, the portion of the switch blade B, contact E, line L–2 to the line L–3 on the opposite side of the insulator I.

The left hand side of the switch blade A is positioned to cooperate with fixed contacts C and D, both of which are connected by a line TL with the teaser winding portion of the autotransformer AT. In series with fixed contact D and the teaser winding is a choke coil, or resistor CC. When the left hand portion A of the movable switch blade is in contact with fixed contact C and the left hand portion of the movable switch blade B is out of contact with the fixed contact E, the circuit is completed from the line L through the line L–1 to the line TL and the teaser winding in turn connected by the line L–2 with the load in line L–3. In this position of the switch, the autotransformer AT will increase the voltage between the line N and the line L–3. In the opposite position of the switch blade, when the portion B of the movable switch is in contact with fixed contact E, the autotransformer AT is by-passed and the voltage between the lines N and L, and N and L–3, is the same.

Figure 2:
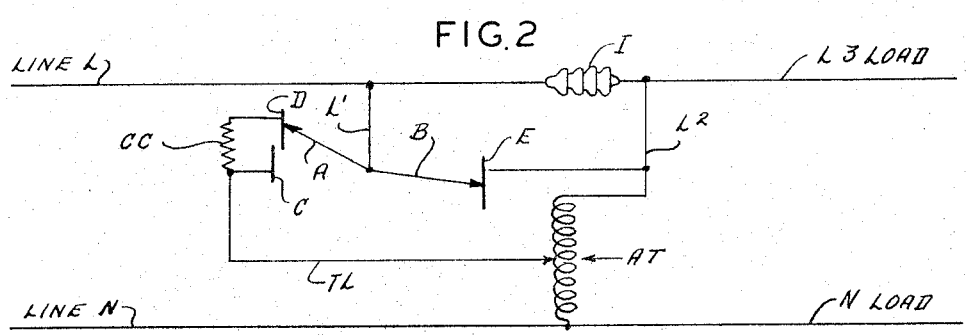
FIG. 2 is a schematic illustration of the structure shown in FIG. 1 showing the parts in a second operative position.
Figure 3:
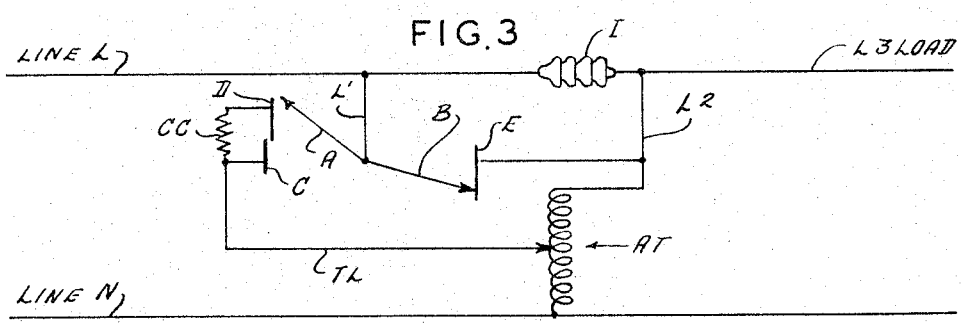
FIG. 3 is a schematic illustration showing the parts of the device in FIG. 1 in a third operative position.

Turning now to FIG. 2, the position of the parts illustrates the action of the switch as it moves from the position shown in FIG. 1 to the by-pass position. During this movement, the left hand portion of the switch A first moves into contact with both fixed contacts C and D, and then to the position shown in FIG. 2 in which the left hand portion A of the movable switch is in contact with fixed contact D while the right hand portion B of the switch makes initial contact with fixed contact E. As the blade portion A moves into contact with both C and D, there is no possibility of arcing since the circuit is still closed through the teaser winding through both contacts C and D and the movable switch blade portion A. Subsequent movement of the portion A of the switch blade out of contact with the fixed contact C completes this circuit through the choke coil, or resistor, CC and at the same time, closes the by-pass through the right hand movable portion B of the switch and fixed contact E. Thus, at the same time, the switch picks up the load from the line L to the line L–3 and, at the same time, closes a circuit through the switch, the choke coil and the teaser winding which will produce a circulating current in this closed loop circuit whose amperage and voltage is limited by the choke coil CC. Consequently, subsequent opening between the left hand movable portion A of the switch from the fixed contact D creates no substantial arc, and the full engagement between the portion B of the movable switch blade and the fixed contact E takes place thereafter and the by-pass is completed. In the reverse operation of the switch blade, the circuit is first completed through the portion A of the movable switch blade to the fixed contact D and thereafter as the portion A of the movable switch blade engages the fixed contact C, but before it leaves fixed contact D, the movable portion B leaves fixed contact E. Thus, the sequence of operation, as shown in FIGS. 1–3, eliminate the formation of arcing and the action of the switch in its sequence of operations is so fast that no noticeable interruption in the load occurs. The amount of voltage increase cut into the lines L and N by closing of the movable contact A and fixed contact C depends upon the setting of the autotransformer AT. The line TL can be attached to several taps on the autotransformer AT, for example, to meet the conditions required by the expected load on the lines L–3 and N. The amount of voltage drop between the lines N and L–3 determines the tap on the autotransformer to which the line TL is connected. Likewise, the amount of stepup in voltage selected by the connection of the line TL in turn determines to some extent the resistance value in the choke coil CC. As will be hereinafter pointed out, the switch, according to this invention, is constructed to make the choke coils, or resistance, variable by interchange of units.

Figure 4:
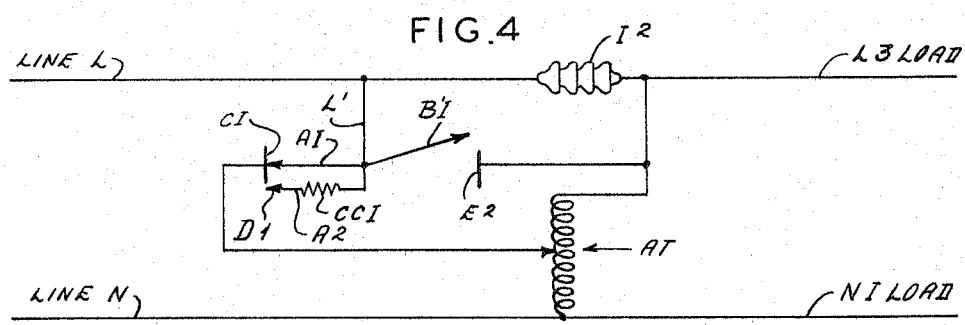
FIG. 4 is a schematic illustration of another embodiment of the same invention showing the parts of the device in a first operative position.

The modification, illustrated schematically in FIGS. 4 through 6, inclusive, has been given similar reference characters to indicate similar parts. In this modification, the choke coil CC–1 is in an auxiliary movable blade A–2 having the movable contact D–1. As the switch is moved from the position shown in FIG. 4 to that in FIG. 5, the movable contact D–1 engages the fixed contact C–1 before the movable contact A–1 disengages the fixed contact C–1. Thereafter, as shown in FIG. 5, as movable contact A–1 leaves fixed contact C–1, movable contact B–1 engages fixed contact E–2. Thereafter, as shown in FIG. 6, movable contact B–1 fully engages fixed contact E–2 and movable contacts A–1 and A–2 open the circuit to fixed contact C–1. This modification operates in exactly the same way as that heretofore described and eliminates the possibility of arcing by movement of the switch, so that the switch can move to by-pass position without interrupting the load to any appreciable extent.

Turning now to FIG. 7, the switch construction therein shown is particularly adapted for operation in the manner schematically shown in FIGS. 1–3. In this switch construction, an angle iron base 1 supports a plurality of spaced insulators 2, 3 and 4 suitably secured thereto by mounting bolts. On the upper end of insulator 3 is a terminal bracket plate 6 which has an extension 7 projecting from the insulator carrying fitting 8 and clamp bolts 9 and 10 protruding through the plate 8 and in threaded engagement with the extension 7 for the purpose of clamping a conductor. In this case, the end of the conductor L–1 is secured to this terminal connection, extension 7, by the plate 8. Terminal plate 6 is made of highly conducting material, preferably copper, and mounted thereon is a copper, or bronze, hinge fitting 12. Both the hinge fitting and the terminal connection plate 6 are secured in place by suitable bolts 15 and 16. The hinge fitting 12 is apertured to receive a hinge pin 17 secured in position by suitable nuts 18 and spring washers beneath the nuts to maintain these nuts from loosening. Rockably mounted on the hinge pin 17 is a blade assembly 20, also constructed of highly conductive metals. The assembly 20 has a pair of bars 21 and 22 spaced on opposite sides of the hinge fitting 12 and held in spaced position by spacer members 23 and 24. Riveted to opposite ends of the bars 21 and 22 are pairs of spaced switch blade members 26 and 28, and 27 and 29, respectively. Switch blade members 26 and 28 are held in spaced relation by the spacer 31, and switch blades 27 and 29 are held in spaced relation by the spacer 32.

Each pair of switch blades carries an identical pull ring and latch hook, and, since they are the same, only one will be described. With particular reference to the latch hook shown in FIG. 7, there is a pull ring 35 formed integral with a bracket with spaced legs 36 and 37. The ends of legs 36 and 37 are apertured to receive a hinge bolt 38 secured in place by a nut 39 and suitable spring washers for locking the nut and bolt against rotation. Legs 36 and 37 of the pull loop 35 preferably straddle the blades 27 and 29. Between the blades and pivoted on the bolt 38 is a latch element 40 biased in a direction in order to hook under the detent 41 by a torsion spring 43. Opposite the hook 40 and integral therewith is a plate 45 protruding in a direction between the legs 36 and 37 of the pullout ring bracket 35 so as to be rotated by this bracket in a direction to remove latch 40 from engagement with detent 41. Operation of the pull ring 35 rocking this bracket will in turn release the latch 40. Rotation of the pull ring 35 far enough to release the latch 40 also engages the plate 45 with the top face of contact 50 to wedge the blades 27 and 29 from engagement with contact 50 which is clamped between the blades 27 and 29. Contact 50 is a fixed contact and formed integrally with a contact plate 51 carrying the terminal connection 52 for clamping a conductor. In this case, the terminal 52 connects with the conductor TL, heretofore described. The terminal plate 51 in turn is held in position on top of insulator 4 by a bolt protruding upwardly from the insulator through the plate. A nut 53 has threaded engagement with this bolt holding the plate 51 in position. Nut 53 also secures a spring 55 which has a portion 56 for camming the latch 40 into engagement with the detent 41. Mounted on top of the insulator 4 is a bracket 58 carrying a fixed contact 59 which projects between the blades 27 and 29 of the switch. Preferably, the edges of the contact 59 are notched at 60 so that when the latch 40 is fully engaged, the switch will make contact only with the terminal 50, but, because of the notches 60, there will be no direct contact between the blades 27 and 29 and fixed contact 59. However, after the latch 40 is released and the switch blade rockably moved toward disengagement with the contact 50, contact will be had with the fixed contact 59 before the blades leave the fixed contact 50. On the bracket 58 is an insulating housing 62 which is hollow to contain an impedance such as a choke coil, or resistor element, 65.

Figure 9:
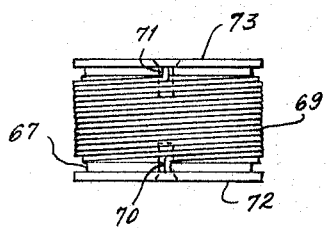
FIG. 9 is a side view of the resistor, or choke coil, element used in FIGS. 7 and 11.
Figure 10:
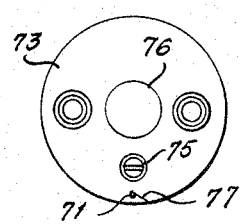
FIG. 10 is an end view of the resistor, or choke coil, element shown in FIG. 9.

Turning now to FIGS. 9 and 10, the choke coil element within the housing 62 is a cylinder of insulating material 67 grooved on its outer surface to receive the coils 69 of a resistor element. This resistor element has its opposite coil ends 70 and 71 fixed in notches formed in the outer periphery of the copper end plates 72 and 73, respectively. Preferably, the ends of the resistor wire coil 69, such as 71, are connected to the end plates by wedge type slots into which the ends of the resistor wire are secured. One of these slots is shown at 77 in FIG. 10. The end of the resistor wire is wedged into the slot 77 and its exposed end peened over and filed down to an even surface. End plates 72 and 73 are secured to the coil support 67 by threaded screws, such as 75, projecting through the end plates 72 and 73 and threaded into the coil support 67. Each plate 72 and 73 is centrally apertured as at 76 to receive the bolt projecting centrally from the insulator 4. And the coil is dropped over this bolt so that its bottom plate 72 makes firm electric contact with the face of bracket 58 and its upper plate 73 makes firm electric contact with the terminal fitting 51 when the nut 53 is threaded tightly upon the bolt clamping the parts together. By removal of the nut 53, therefore, it is possible to change sizes by replacing one coil with another.

Insulator 2 carries a terminal bracket 80 with a terminal fitting 81 and suitable clamping bolts 82 for securing a conductor to the terminal bracket 80. In this case, the conductor secured to the fitting 81 is the conductor L-2, shown in FIGS. 1-3. The conductor bracket 80 is secured on the top of the insulator 2 by a bolt protruding from the insulator and a nut 84 screwed thereon. The terminal bracket 80 has a fixed contact 85 carrying a detent 86. These elements correspond with fixed contact 50 and detent 41, already described. There is also a keeper spring 88 held in place by nut 84 which in turn is identical with the keeper spring 55.

On the right hand end of the blade assembly 20 is a pullout ring 90 which in turn is constructed to operate a latch 91 constructed and arranged the same as the latch 40 and the pullout ring 35, heretofore described.

The operation of the switch construction, just described, is the same as that schematically illustrated in FIGS. 1-3. In this embodiment of the invention, an insulated hook stick is used to operate the switch from the position shown to a position in which the switch blades 26 and 28 grip opposite sides of the fixed contact 85. The hook of the switch stick is engaged in the pullout loop 35. A quick yank on the hook stick pivots the latch 40 from engagement with detent 41 by rotating the pullout loop 35 in a clockwise direction to force the plate 45 to wedge the switch blades 27 and 29 away from the fixed contact 50. As the switch blade assembly 20 itself is rocked in the same direction, that is, clockwise, the contact 59 is first engaged by the blades before separation with the contact 50. Thereafter, switch blades 26 and 28 contact fixed contact 85, and the blades 27 and 29 leave the fixed contact 59 as the blades 26 and 28 move into full engagement with the contact 85. To reverse the process, it is only necessary to place the hook of the hook stick in the pullout loop 90 and jerk the latch 91 free from detent 86 and blades 26 and 28 from fixed contact 85. The operation in either direction is accomplished so rapidly, and this sequence of contacts made so quickly that no interruption in current flow can be observed. Furthermore, no serious arcing will occur due to the action of the choke coil.

Figure 8:
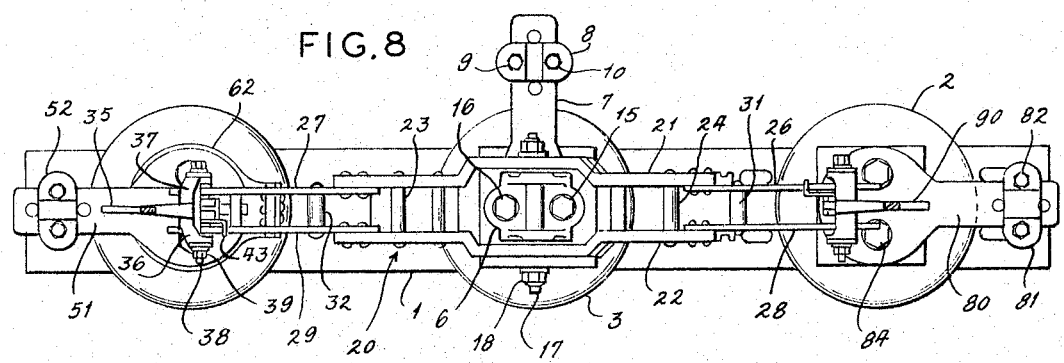
FIG. 8 is a top view of the switch shown in FIG. 7.
Figure 11:
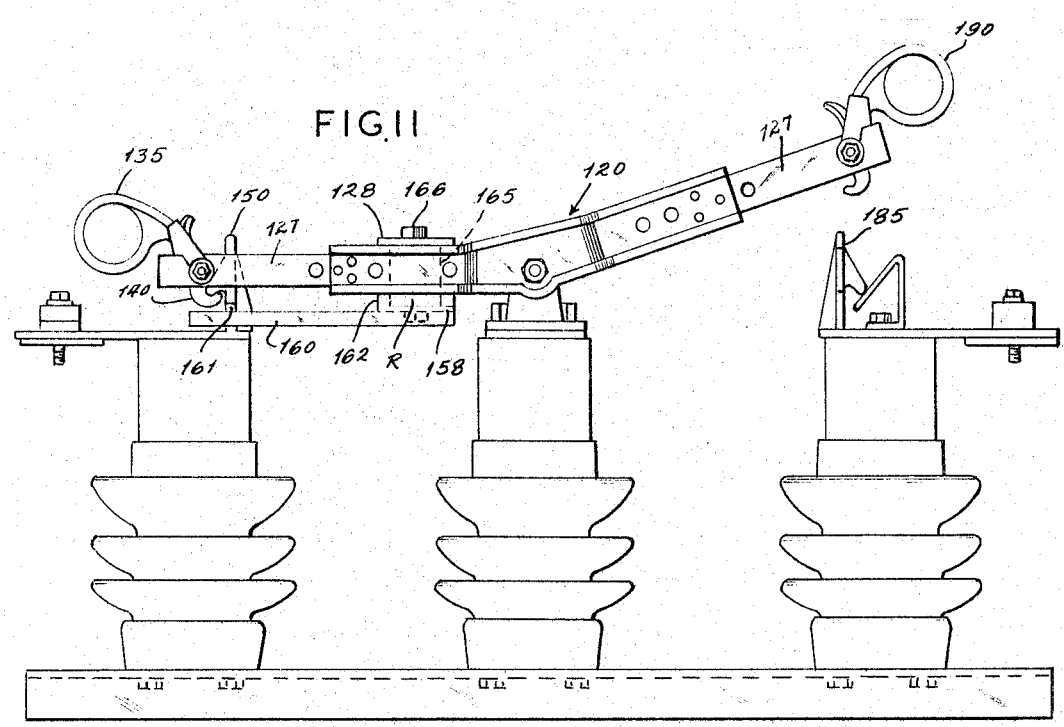
FIG. 11 is a side elevational view of a modified form of a switch structure for use in the system shown in FIGS. 4–6.

FIG. 11 shows a second embodiment of the invention, such as schematically illustrated in FIGS. 4 through 6, inclusive. Since the construction is substantially identical to that disclosed in FIGS. 7 and 8, this description will be confined to the differences. The switch blade assembly 120 disclosed in FIG. 11 is constructed in a similar manner to the switch blade assembly 20. Between the switch blades 127 is a plate 128 secured to both and in electric contact with blades 127. Secured in this plate 128 is a housing 162 which contains a resistor coil 165 constructed in the same manner as that shown in FIGS. 9 and 10. A bolt 166 projects through the plate 128 and coil 165. Beneath the housing 162 and closing the lower end thereof so as to be in contact with the lower metal plate on the coil 165 is a plate of conducting material 158 carrying the movable contact blades 160 which straddle the fixed contact 150, so that when the switch is in the position shown in FIG. 11, the blades 160 are on opposite sides of a notched portion 161 of the fixed contact 150 while the blades 127 wedgingly engage and make electric contact with opposite side edges of the fixed contact 150. The operation of this modification is such that when the pull ring 135 is engaged by a hook stick and jerked to release the latch 140, the blades 127 will move upwardly on the sides of the fixed contact 150 and in turn bring the blades 160 into contact with the side edges of the fixed contact 150 before the blades 127 engage opposite sides of the fixed contact 185. After blades 127 leave contact 150, blades 128 engage contact 185 and the circuit then is by-passed, but blades 160 are still in contact so as to retain the resistance 165 in series with the teaser winding, as heretofore described in the operation illustrated in FIGS. 4–6, inclusive. The difference between the modification in FIG. 11 and that in FIG. 7 is only in the location of the choke coil 165. Otherwise, the two constructions function in exactly the same way to produce the same result.

Changes in and modifications of the construction described may be made without departing from the spirit of my invention or sacrificing its advantages.

Having thus described the invention, what is claimed and desired to be secured by Letters Patent is:

1. In a disconnect type of electric switch the combination comprising, (1) a base, (2) a pair of insulators mounted in spaced relation on said base, (3) a fixed contact supported by each of said insulators, (4) a third insulator located between said pair of insulators and supporting a hinge connection, (5) a movable contact member rockably supported on said hinge mounting for movement of its opposite ends alternately into and out of engagement with said fixed contacts, (6) an electric terminal connection to said movable contact, (7) an electric terminal connection to each of said fixed contacts, (8) an auxiliary contact mounted on said switch and permanently electrically connected with one of (3) and (4), (9) an impedance element permanently electrically connected in series circuit relation between said auxiliary contact and the one of (3) and (4) to which said auxiliary contact is permanently electrically connected, and (10) means operative during rocking movement of said movable contact member in the direction which breaks its engagement with one of said fixed contacts and makes its engagement with the other of said fixed contacts to successively:
   (a) complete an electrical circuit from said movable contact member through said auxiliary contact to energize said impedance element before said movable contact member breaks engagement with said one fixed contact,
   (b) break engagement between said movable contact member and said one fixed contact while free of contact with the other fixed contact,
   (c) make engagement between said movable contact member with the other fixed contact while said auxiliary contact maintains the said impedance element energized, and
   (d) break the electrical circuit through said auxiliary contact and said impedance while said movable contact member is in engagement with said other fixed contact.

2. The combination defined in claim 1 in which,
   (a) said auxiliary contact projects from said switch in the direction of movement of said movable contact, and is supported on one of said insulators,
   (b) said inpedance element is supported by the insulator carrying said auxiliary contact,
   (c) and said impedance element forms the electrical connection between said auxiliary contact and the electric terminal connection to the fixed contact on the same insulator.

3. The combination as defined in claim 1 in which,
   (a) said auxiliary contact is carried by said movable contact member for movement into engagement with one of said fixed contacts supported on one of said insulators,
   (b) said impedance element is supported by said movable contact, and
   (c) said impedance element forms the electrical connection between said auxiliary contact and the electric terminal connection with said movable contact.

4. In a disconnect switch, a central stationary contact, a walking beam pivoted adjacent said central stationary contact and having a pair of main contacts one at each end, said main contacts being permanently electrically and mechanically connected together and to said central stationary contact, a pair of remote stationary contacts disposed respectively for engagement with the main contacts at opposite ends of said walking beam, said stationary contacts being so located with respect to the orbit of movement of said walking beam that contact is made at one of said main contacts within less than 30° of the position at which contact is broken at the other of said main contacts, and an auxiliary contact disposed adjacent one of said pair of remote contacts at a position such as to make contact with a conductive part associated with said walking beam and to maintain said contact substantially throughout the orbit of movement of said walking beam between the position at which contact is made at one of said main contacts and the position at which contact is broken with the other of said main contacts.

5. The switch of claim 4 wherein an impedance is connected to be energized while one of said main contacts engages said auxiliary contact.

6. A switch having a two-arm movable contact member, said two arms being fixed in angularly displaced relationship and connected to move together about a hinge, two stationary contacts disposed relative to the orbit of said two arms that in the movement of said two arms about said hinge one of said arms makes contact with one of said stationary contacts after the other of said arms breaks contact with its cooperating stationary contact, and a third stationary contact arranged with relation to the orbit of said movable contact member so that the latter makes contact with said third contact at a position ahead of breaking of contact with one of said two stationary contacts and maintains such contact until said movable contact member has made contact with the other of said two stationary contacts.

References Cited by the Examiner

UNITED STATES PATENTS

| | | | |
|---|---|---|---|
| 385,826 | 7/1888 | Sechrist | 200—1 |
| 535,077 | 3/1895 | Potter | 200—144 |
| 820,331 | 5/1906 | Anderson | 200—1 |
| 965,234 | 7/1910 | Scott | 200—146 |
| 2,027,219 | 1/1936 | Austin | 200—144 |
| 2,099,639 | 11/1937 | Wood | 200—146 |
| 2,180,193 | 11/1939 | Brand | 323—43.5 |
| 2,315,913 | 4/1943 | Weed | 323—43.5 |
| 2,824,916 | 2/1958 | Steinmayer et al. | 200—48 X |
| 2,838,636 | 6/1958 | Schwager | 200—145 |
| 3,039,041 | 6/1962 | Jansen | 323—43.5 |
| 3,071,662 | 1/1963 | Field | 200—48 |

FOREIGN PATENTS

| | | |
|---|---|---|
| 561,556 | 8/1958 | Canada. |
| 819,416 | 5/1937 | France. |

ROBERT K. SCHAEFER, *Primary Examiner.*

L. McCOLLUM, KATHLEEN H. CLAFFY, *Examiners.*

J. M. THOMSON, ROBERT S. MACON,
    *Assistant Examiners.*